United States Patent [19]

Warszawski

[11] 4,172,924
[45] Oct. 30, 1979

[54] AIR BATTERY AND ELECTROCHEMICAL METHOD

[75] Inventor: Bernard Warszawski, Paris, France

[73] Assignee: Societe Generale de Constructions Electriques et Mecaniques Alsthom, Paris, France

[21] Appl. No.: 879,228

[22] Filed: Feb. 21, 1978

Related U.S. Application Data

[63] Continuation of Ser. No. 702,986, Jul. 6, 1976, abandoned, which is a continuation-in-part of Ser. No. 596,449, Jul. 16, 1975, abandoned.

[30] Foreign Application Priority Data

Jul. 19, 1974 [FR] France .................................. 74 25195

[51] Int. Cl.² ...................... H01M 8/00; H01M 12/06
[52] U.S. Cl. ........................................ 429/15; 429/27; 429/68
[58] Field of Search ................. 429/12, 13, 15, 27, 429/67, 68, 101, 127

[56] References Cited

U.S. PATENT DOCUMENTS 3,414,437  12/1968  Doundoulakis et al. .............. 429/70
3,493,434   2/1970  Goodkin ................................ 429/231
3,847,671  11/1974  Leparulo et al. ...................... 429/15
3,887,400   6/1975  Doniat .................................... 429/15

FOREIGN PATENT DOCUMENTS 48-44294  12/1973  Japan.
48-56032  12/1973  Japan ..................................... 429/13

Primary Examiner—Donald L. Walton
Attorney, Agent, or Firm—Frishauf, Holtz, Goodman & Woodward

[57] ABSTRACT

Method and apparatus for electrochemically producing electricity. Ion conductivity is established between an oxygen-reducing electrode, and adjacent ion pervious insulating membrane, a paste which has flow characteristics comprising particles of an oxidizable metal and a liquid electrolyte, and an inert electrode in physical contact with said paste. In said paste, the metal particles are in an amount constituting from 60% up to the critical pigment volume composition. The metal paste is moved from a first reservoir through the electrochemical battery wherein it is oxidized to the corresponding metal oxide paste and passed to a second reservoir. The battery may be recharged by reversing the movement and electrolyzing, or by reducing the metal oxide paste in an external circuit.

24 Claims, 1 Drawing Figure

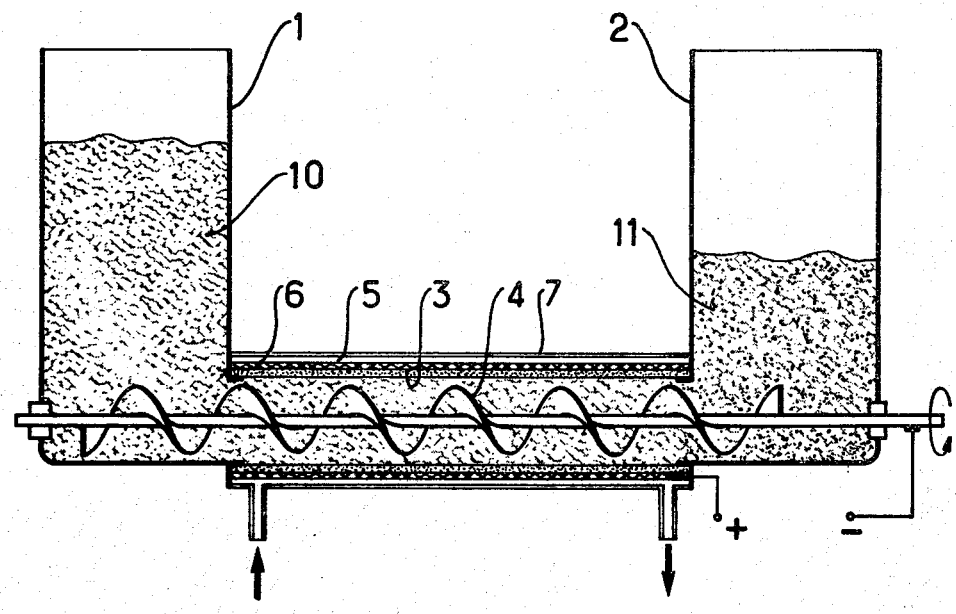

AIR BATTERY AND ELECTROCHEMICAL METHOD

This is a continuation of application Ser. No. 702,986 filed on July 6, 1976, now abandoned which is a continuation-in-part of Ser. No. 596,449 filed July 16, 1975 and now abandoned.

This invention relates to a method and device for use in the production of electricity. It concerns electrochemical batteries which consume, at the negative electrode, a reactive metal such as zinc, iron, cadmium or lead, and an oxidizing gas such as oxygen (notably the oxygen contained in the atmosphere) at the positive electrode.

It is known that the metal-air batteries such as these, present remarkable characteristics which make them suitable for a number of important uses such as:
  Non-polluting metal-air batteries; and
  batteries in which the metal electrode does not require catalyst.

A battery having an air (oxygen) electrode in the widest sense of the term, whose electrolyte is alkaline can be provided with inexpensive catalysts having no critical characteristics: excellent performances have already been attained by using a catalyst such as carbon with no additives.

The density of theoretical energy of metal-air couples is high: for example, 1350 Wh/Kg. of zinc for the zinc-air couple, and the practical density can be even a fraction higher. The elements used to build these metal-air batteries and the active materials used in them, notably zinc-air and iron-air are usually abundant and inexpensive, thus enabling them to be used for mass purposes. Also certain metal-air batteries can be recharged due to the use of metals which, once they have been oxidized can be returned to their original state or be replaced by new metal. This operation is usually done electrochemically by reversing the direction of current (the battery, turned into an electrolysis circuit, regenerates the metal), or mechanically (extraction of oxidized negative electrodes and replacing them by new ones). Secondary metal-air batteries can thus be made which are chargeable electrochemically (traditional accumulators) or mechanically, these, when applied to electrical traction, are particularly advantageous.

However, in their present state, the primary or secondary metal-air batteries have a number of limitations and problems which reduce performance, thus diminishing industrial applications.

In most metal-air batteries the metal is an integral part of the battery but only represents a limited part of the battery's weight and volume due to the presence of certain inactive components (current collectors, air electrode, electrolyte, tight joints, separators, diaphragm, etc.); and the density of energy of the battery only represents a fraction of the density of the metal-air couple's practical energy (already lower than the theoretical energy density).

In the case where the metal is an integral part of the battery and if the latter is also a secondary battery, the recharging operation presents logistic problems which are almost insoluble when applied to electrical traction.

In one particular case, where the recharging operation is electrochemical, we can note the following disadvantages:
  characteristic alterations and sometimes electrode destruction due to alternative cathodic (discharge)- anodic (charge) use; the introduction of a third electrode makes the structure even more complicated and adds delicate switching problems to this.
  the need for an important ground organization of well distributed individual charging stations limits the large-scale development of vehicles equipped with these batteries, especially in existing cities where such an organization would be much too costly if not entirely technically unrealistic.

If we consider the zinc-air battery, the following additional disadvantages are known:
  during recharging, zinc dendrites are formed which can cause short-circuits;
  the zinc electrode can be deformed and this increases with the number of charging-discharging cycles causing performance alteration and mechanical degration; and
  the capacity of progressively reduced through the formation of isolated-zinc deposits.

Where recharging is done mechanically, we have the following problems:
  the metal has to be put into a form enabling it to be easily introduced into the battery with an electrical connection, then removed once it has been oxidized: this means a mechanically elaborate electrode, thus very expensive;
  the need for constructing the battery so that a large number of electrodes can be introduced, processed, and removed: this means the strict mechanical requirements of a device with mobile elements: high cost and low reliability; and
  the replacement of the consumed electrodes by hand entails a long and delicate process.

Several solutions have been considered to solve these problems as well as those caused by the zinc-air process. The only one which appears capable of solving them is that of the zinc-air battery which circulates a zinc-powder suspension. In this case, the zinc is no longer an integral part of the battery but is stored in the form of a liquid, and the regeneration of the spent liquid, that is, the zinc-oxide suspension, is done in a separate electrolytic cell where only a simple pumping action is required. We could even consider distributing a reactive liquid to automobiles (along with the removal of used liquid) by means of a distribution network like those existing already. As for the regeneration of the spent liquid, this could be done in distribution stations without requiring an enormous power supply. This eliminates the logistic inferiority of the storage battery when compared to the fuel cell. The storing of the reactive liquid outside of the battery enables each application to receive the best performance of the unit. The separation of the generating of the electrical energy and regenerating the reactive liquid between two separate devices associated with the characteristics of the zinc powder in suspension enable some of the former difficulties to be resolved.

The air electrode, now divided into two parts is always used as the cathode in the battery and as the anode in the electrolyser. The structure and manufacture of each one of these air electrodes can be simpler and less expensive than the former single electrode. The degradation of the air electrode through alternative anodic-cathodic states is avoided.

The problem of changing the form of the zinc electrode no longer exists either, nor that of the capacity reduction due to isolated deposits; the suspension of zinc powder can be recycled without performance loss.

However, the zinc suspension circulation accumulator presents the following disadvantages:

The zinc powder and zinc oxide suspension (the latter possibly being in colloidal form) in the electrolyte is a metastable system whose equilibrium can easily be broken by local or general disturbances (change of pH, change of temperature, narrowing of conduit, formation of precipitates, crystal formation following cycling, increasing formation of carbonates, etc.) causing flocculation precipitation or decantation of solid phase.

Such a break in equilibrium can have disastrous effects on the functioning of this system (equivalent to thrombosis in the body). It can also be inconvenient during storing (requiring a device to put the liquid back into suspension form). Thus, it must be avoided or limited.

One practical implication of the necessity to maintain the metastability of a combined suspension with its own characteristics is the need of a large passage area for the suspension. The result is:
- a fairly low battery volume/electrode surface proportion, thus a restrained power density (35 W/kg.)
- a problem of putting the elements into series to obtain the necessary voltage for use: excessive shunting that would be caused by a common electrolyte filling wide dimension pipes obliges us to introduce discontinuities and thus complicate the system.
- another implication of metastability is that the density of the energy stored is relatively low, since increases to a high level of the amount of zinc in suspension is limited by the increasing instability of zinc and/or zinc oxide: we would obtain 155 WH/kg of zinc powder electrolyte mixture.

If during regeneration, the pulverulent zinc does not go directly into suspension, a complex technique is needed to recover the zinc from the electrode on which it is formed and then put it back into suspension into the electrolyte when its time comes to be used. Generally speaking, regeneration is not a simple operation such as the discharge operation but a much more complex and complicated process, more related to the manufacturing of a product by a number of successive treatments, than an elementary procedure carried out on a macroscopically homogeneous fluid which would keep its identity during cycling. Such a process inevitably is more expensive.

The complete system appears very complex and delicate to process, thus very expensive.

Furthermore, the following problems also appear:

Each grain of zinc of the suspension cannot be oxidized electrochemically before the moment when, moving within the suspension, it comes into direct contact with the battery's inert (negative) electrode; the result is, that all this time, a very small fraction of zinc powder reacts and consequently, since the current density supported by the zinc is very high, it would run the risk of passivation.

With the air electrode, a high evaporation rate of water occurs when the battery operates. The evaporated water can partially be recovered in a condenser, but there will always be a high loss which must be compensated.

The basic electrolyte carbonated by the atmosphere's carbon dioxide can be treated during recharging, but this decarbonation is probably an additional operation (chemical or electrodialisis, for example) on the electrolyte which is independant from the charge as such, thus another servitude which cannot be overlooked.

The basic electrolyte concentrated from the exhausted liquid has a large amount of dissolved zincate. During recharging, most of the zincate is reduced to a pulverulent deposit of zinc; however, a certain amount adheres to the cathode and becomes larger and larger, and may require periodical dissolution if it becomes cumbersome.

Furthermore, there exist parts of the cathode of the electrolyser around which the electrolyte is stagnant and we risk a continuous increase of dendrites; we know the risks of these formations.

The zinc-air battery for the circulation of zinc suspension powder offers an interesting combination of advantages, availability of material, simplification of the research and development problems in the battery and electrolyser technology, their life span capacity conservation, instant recharging, and the logistic of an application to the automobile market.

However, this battery does not yet have the performance level (power and energy density), the simplicity (of structure, operating and labour), or the price needed to attract the automobile market (as well as other applications). Yet the level which has already been attained seems close to that which could be hoped for: when we try to gain a further improvement at one point, this increases the instability of the zinc-electrolyte zinc oxide suspension, thus losing ground on the other side to compensate the effects.

The use of solids in suspension has been an important novelty in the field of air-metal batteries but have intrinsic limitations.

According to a first aspect of the invention there is provided a method of producing electricity by the oxidation of a metal such as zinc, iron, cadmium or lead, and reduction of a gas containing oxygen such as the atmospheric air; comprising causing a paste to circulate through a battery, the paste being composed of grains of metal and an electrolyte in permanent movement, the paste of metal and electrolyte being progressively transformed, at least partially, into an oxidized metal paste during its passage through the battery, the metal powder concentration being close to the maximum for the grains, and the quantity of electrolyte in the paste being about the quantity necessary to fill the spaces between the grains and to ensure the ionic transfer.

According to a second aspect of the invention there is provided a device for carrying out the method defined in the preceding paragraph comprising a first paste reservoir, a second paste reservoir, a conduit connecting the first reservoir to the second one, this conduit including an electrochemical battery having at least one inert electrode fed by oxygen or a gas containing oxygen such as the atmosphere and enabling this oxygen to be reduced, a simple or composite diaphragm in electrolytic contact with this first electrode, and a second inert electrode separated by at least one cavity making up part of the conduit and communicating by at least one entry and one exit with the rest of the conduit; means for moving the paste from the first reservoir to the second reservoir through the conduit and battery so that the paste in this cavity contacts the diaphragm and the second electrode in this cavity, the metal being oxidized and the oxygen reduced in order to produce electrical energy.

The invention will now be described in more detail by way of example only, with reference to the accompanying drawing in which the single FIGURE shows a cross section through a battery in accordance with the invention.

An electrochemical battery in accordance with the invention, comprises:

A first inert electrode, i.e., the cathode of the battery, fed by oxygen or a gas containing oxygen at which this oxygen is reduced;
  a simple or composite diaphragm in electrolytic contact with this first electrode; and
  a second inert electrode i.e., the anode of the battery, separated from the diaphragm by at least one cavity and communicating by an entry and an exit with the outside of the battery.

A metal-electrolyte powder paste, whose composition is close to the geometric maximum concentration of granules, is inserted into the cavity so that it is in contact with the diaphragm at the same time as the second electrode. This paste is pumped into the device from a storage reservoir for fresh paste. During passage throught the battery the metal grains are oxidized and finally end up in the storage reservoir for the oxidized metal.

By inert electrode, we mean an electrical conductor on which the electrochemical reaction takes place but which does not go through any transformation during this procedure.

By inert electrode fed by oxygen or a gas containing oxygen and allowing this oxygen to be reduced, we mean the electrode known as oxygen electrode; for example, this electrode can be a porous leaf or plate made of carbon and a binder such as polytetrafluorethelene (PTFE) containing a catalyst to electrochemically reduce the oxygen such as silver or active carbon. One of its sides contacts the electrolyte and the oxygen contacts the other.

The second inert electrode can be made of metal, graphite or plastic made into a conductor by an appropriate charge.

By simple or composite diaphragm, we mean a separator made up of one or several juxtaposed leaves ensuring electrolytic conductivity between the two half-elements of the battery as well as ensuring their electronic separation. The diaphragm can be made of one or more leafs of microporous insulation (i.e. microporous polyvinyl chloride, microporous polyethylene, nonwoven polypropylene, etc.) impregnated with electrolyte and/or several ion-exchanging membranes and/or one or more sheets cellophane, etc.

By electrolytic contact, we mean that there is an electrolytic medium contained between the diaphragm and the air electrode.

When the paste is introduced into the above-mentioned cavity, it comes into contact at the same time with the diaphragm and with the second inert electrode. The different electrolytic environments present in the element (liquid of the paste, diaphragm, electrolyte situated in the oxygen half-element) form an ionic conductor which is continuous and which goes from the first to the second inert electrode. An electronic continuity is also established between at least part of the metal grains of the paste and the second inert electrode. The two inert electrodes become polarized, that is positive for the first and negative for the second. In a system thus made up, the different electrochemical processes needed for the production of electrical energy work while the paste is in circulation.

The composition of the metal electrolyte powder paste is that of (or close to that of) the maximum geometric concentration of the granules and liquid in the exact volume of the interstitial space. This particular composition of liquid-pigment mixtures has a remarkable group of physical properties. This composition is well known in paint terminology as the critical pigment volume concentration (CPVC), see for example "Dispersion of Powders in Liquids" (With Special Reference to Pigments) 2nd Ed., edited by G. D. Parfitt, Applied Science Publishers Ltd. (London), pages 345–346; and "Concentration Volumetrique Critique en Pigments et la theorie des rapports volumetriques" by Alexandre Flamm, Technologie, vol. 38, no. 6 June 1962, pages 320–335, referring to this subject which discloses the corresponding French language abbreviation CVCP; said Parfitt text and said Framm article together with the references cited in these papers are incorporated herein by this reference.

It is important to review some of the general properties of the pigment-liquid paste mixtures of CPVC, as well as some of the particular properties in the case, which concerns this invention, where some of the solid pigments are grains of metal conductors and electrochemically oxidizable. These properties are notably different from those of suspensions.

A pasty mixture pigment-liquid of CPVC is fluid and thus can be pumped; its viscosity is higher, the closer we get to the CPVC. But if this composition exceeds the CVCP, (that is, if the volume of liquid becomes less than interstitial volume of the grains at maximum geometric packing) the mixture becomes rigid and cannot be pumped; thus it is essential that the paste does not exceed the CPVC when it has to have the properties of a fluid. The pastes operative in this invention must always have a concentration of solids between the CPVC and 60% of that value.

A pasty CPVC mixture behaves like a fluid which is homogeneous on a macroscopic scale and perfectly stable, that is without a tendency of phase separation or internal segregations unlike dilute suspensions. This stability which comes from the microstructure created by the critical composition is obtained without the necessity of adding a gelling agent as is the case in other pastes whose composition is further from the CPVC and remains the same whatever the mechanical limitations imposed on the paste in the battery (pumping, narrowing and change of direction, change of temperature, etc. . . .). It also remains stable during electrochemical transformation of the granules of metal into grains of metallic oxide. This transformation does not make the paste lose its specific microscopic topology. It also remains stable during chemical disturbances or others which can effect the paste (change of pH, carbonation, etc.).

Stability is of great importance of course, as we have already seen, as well during the storing of the reactive liquid in the reservoirs as during its circulation in the battery.

Homogeneousity is needed to simplify the problems of pumping and uniform distribution of such a fluid among all the elements of a battery.

The result is that the paste of metal powder and electrolyte of CPVC can be pumped through a battery and without any of the precautions which have to be taken with the unstable suspensions. It therefore has none of the disadvantages which result from this. In particular it is possible to have compact batteries with small passageways which consequently have a high power density. Since such a paste acts like a solid in rectilinear or bent capillary tubes and it has no discernible lateral effect, it can be moved with a minimum of energy consumption in the tubes whose cross-sections can have any form and dimensions. This is very different from conventional suspensions and they can thus provide simple and inexpensive structures.

The result also is that the paste can be stored, handled, pumped, measured, etc. ... like a homogeneous fluid, which considerably simplifies the problem of transportation, distribution of fresh paste, and the returning of the oxidized paste; thus the logistic and commercial advantages are obvious.

The paste of metal powder and electrolyte of CPVC (which from now on will be called metal paste) is composed of the most concentrated form possible which can be given to a solid while keeping its fluid properties. The capacity of the metal paste, and consequently the energy density of the metal paste-air couple represents the maximum for a metal in the form of a pumpable product.

For example, for the Zinc-paste-air couple, the electrical energy which can be used contained in the zinc paste (with a faradic efficiency of 85% and a battery operating at 1.1 volt) is 425 Wh/kg of paste.

the grains of metal in the paste of CPVC form chains of conductors which electronically link to the inert electrode a high proportion of the grains situated in the mass of the volume of the paste filling the cavity. The internal movements of the paste during circulation results in electrical contact between all the grains.

It follows that as opposed to powder suspensions:
(1) the grains of metal do not need to come directly into contact with the inert electrode to react; thus it is not necessary to impose a turbulent motion on the paste as is the case with suspensions where each grain must come into contact with the inert electrode; a slow laminar motion is enough to move it: the necessary speeds are about a millimeter per minute to a millimeter per second depending on the path of circulation; the pumping power corresponding to this is at the order of a small percentage of the power produced.
(2) the number of grains of metal at all times in contact with the electrode and thus capable of reacting is very high: the effective current density is weak for a high apparent current density (i.e. density of current referred to the surface area of the inert electrode); thus it is possible to obtain very high power densities without the risk of loss of activity.
(3) the yield in terms of electrochemical transformation of the metal into metal oxide is very high for a single passage of the paste through the battery; it is in fact well known that the yield in terms of electrochemical oxidation of a fixed bed of metal, (such as zinc metal powder and expanding agent) is very high, and can go over 85%; the yield of a moving bed such as that of the paste in circulation is even higher, since the motion, even it it is very slow ensures the renewing of the contacts between the grains; thus it is not necessary for the paste to be recycled for all the energy to be taken out, which simplifies the system of the complete battery as much as possible.

After having passed through the battery, the oxidized paste can be regenerated, that is, brought back to the state of electrolyte in the metal powder interstices by a procedure which is converse to the one which generates the energy. The oxidized paste can be put through an electrolyzer of the same type as the battery (which could even be the same device successively used as a battery and as an electrolyser but it is better to provide unifunctional devices at least to avoid the problem of the air electrodes as already described. In the course of the motion during which the electrolyzer is supplied with electrical energy, the zinc oxide grains are reduced into grains of zinc which are easy to obtain in such a way that they do not form a continuous mass, and in a way in which the reduction yield can be as great as that for the oxidation reaction.

These yields do not dimish after each recycling of the paste; grains which could have progressively been isolated from the others in a fixed bed, thus reducing the capacity by a well known process, come into contact with a conducting chain and react.

The metallic oxide paste can be brought back to the state of metal paste by an elementary procedure which conserves its identity of a macroscopically homogenous fluid. Thus it is possible to constitute with the metal paste entirely self-contained (rechargeable) storage batteries by the association of a battery and electrolyser of the type described above, storage reservoirs for fresh and oxidized paste, pumping means and auxiliary cooling and regulation devices. Such storage batteries can be either:

recharged from the power mains in a few hours as is done in classical procedures, or instantly recharged by the direct replacement of the oxidized paste by new paste through pumping (or by an exchange of reservoirs), the oxidized paste being then regenerated in a specialized station, for example a service station.

The interest of storage batteries having such logistic advantages is obvious for the progressive introduction and ultimate development on a greater scale for electric traction.

The paste of metal powder and electrolyte having a composition close to the CPVC can be composed as we have said, of zinc, iron, cadmium or lead, the zinc presenting a particular interest since its energy density is so high. The size of the granules (particles) is not critical and can vary from one fraction of a micron to several tens of microns. The preferred range of particle size is between about 0.1 and 60 microns.

The constituent electrolyte can be aqueous, alkaline, saline or acid or even non-aqueous. The latter is of interest for example when using an alkali metal as the metal powder constituent of the paste. The electrolyte must be chosen in relation to the metal considered, so that the electrochemical reaction will proceed with a minimum of parasitic reactions and the metal oxidation product will be solid and not soluble in the electrolyte so that it will not lose its identity as a paste during oxidation. The case where the electrolyte is acid is hardly feasable with the examples of metal which have been given except for lead. We can make, for example, a lead-sulfuric acid paste. The other metals, in acid contact, generally give soluble cations by oxidation, and the original paste does not keep its identity, since it transforms itself progressively into a suspension and then a solution.

The use of a saline (salt) electrolyte is important, especially to avoid carbonation by the atmosphere's carbon dioxide.

The alkaline electrolyte is the one which is generally the most advantageous to use. In fact:

its conductivity can be very high if it is concentrated;

the oxidation of the metals considered is carried out in an alkaline environment with rapid agitation; zinc, in particular is oxidized with current densities which are very high and in conditions which are near to those of thermodynamic reversibility (that is, with a low overvoltage) and the same goes for the inverse reaction which is that of reduction;

the oxidation product of the metal is an oxide (and not a salt) so that the electrolyte remains unchanged;

the air electrode does not require, in an alkaline environment, precious metals as the catalyst in order to function.

The alkaline electrolyte is preferably a solution of sodium hydroxide or potassium hydroxide and preferably the latter. Its concentration can be in a large range (for example 0.01 N to 13.5 N) but it is preferably high, i.e. between 7 and 13.5 N.

The paste can have added to it all agents which may improve its properties. In particular, it can have added to it (in the proportion of a few percent for example) a solid lubricant which can improve its fluidity. Such a lubricant can be for example a polytetrafluorethelene powder (PTFE) or graphite powder. It shall be noted, however, that such an addition is not required because the composition of the paste, near that of CPVC corresponds to the maximum geometric concentration of the grains and to the complete filling of the interstitial volume by the electrolytic liquid. At any rate, such additions in no case perturb the ionic exchanges which seems the case in other known pastes. Furthermore, this lubricant is not used to form a gel with the water or the alkali as is the case in conventional pastes. The paste can also have a conductor added to it such as graphite or carbon black or a metal which does not take part in oxidation in order to increase its electronic conductivity. We can also, in the case of zinc, add a small percentage of mercury to it to improve the preservation of the paste by reducing its self-discharging rate.

The CPVC depends on the grain size of the solids and of their range of sizes, and it varies with the powder chosen to constitute the paste. In practice, however, the paste's composition can be chosen in a fairly large range since it appears that the properties of the CPVC hardly vary in its immediate vicinity. This variation remains acceptable in a range of concentration of solids going from CPVC to about 60%, that is, as long as it does not behave like a suspension.

For example, with a zinc powder whose average particle size is a few microns, we can prepare a zinc paste according to the following volumetric composition:

Zinc: 27%
PFTE (solid lubricant): 3%
KOH 10 N: 70%

At the end of the oxidation procedure, an oxidized paste corresponding to the following composition will replace it:

Zinc oxide: 37%
PTFE: 3%
KOH 10 N: 60%

(the density of the two pastes is about the same, i.e., about 2.95).

It can be of interest to prepare the paste starting from the oxide and then to reduce the paste. Actually, it is easier to obtain pure oxide with a fine (smaller) particle size than the metal in powder form. This operation can be done in an electrolizer associated with a battery in an appropriate industrial installation.

In the drawing which shows a cross-section through a battery in accordance with the invention, there appears a first storage reservoir 1 for the storing of the zinc paste 10 and a reservoir 2 for receiving the zinc oxide paste 11. Between the two there is a tubular electrical battery. The two reservoirs are connected by an insulating porous cylinder 3 which makes up the diaphragm of the battery. An archimedes screw 4 made up of a conducting material, such as metal, arranged along the axis is used to move the zinc paste (and the zinc oxide) and also serves as an inert negative electrode. An annular conduit 5 defined by the outside envelope 7 and towards the centre by a porous conducting wall 6 comprises a metal web, a carbon filling agent and a hydrophobic link member forming an air electrode (positive). It allows the free passage of air. The power consumed for the circulation of air and paste is around a few percent of that of the battery.

The battery starts immediately at ordinary temperature as soon as it is connected to the power supply. It can hold variation of charge which can be quite brutal including short-circuits.

The performance of the battery at average power relative to the total free enthalpy contained in the zinc paste - air cell is about ⅔: the generator produces 2 W of usable electricity for 1 W of thermal energy. The energy indicated of 425 Wh per kg of paste is the usable electric energy and not the total free enthalpy.

It is interesting to show how certain traditional problems of the zinc-air storage battery on which much money is presently being spent are resolved here (certain problems have already been described above, thus we will just mention them).

Passivation (loss of activity) during discharge: resolved by the divided state of the zinc of the paste.

Change of form of the zinc electrode: eliminated by the transit of the reagent in fluid form.

Reduction of capacity by the progressive formation of isolated deposits: eliminated by the internal movements of the moving paste.

Alteration of the characerictics and destruction of the air electrode with two functions: eliminated by the use of two air electrodes, independent cathode and anode.

The formation of dendrites during recharging: the geometry of the cathode is such that the whole surface is covered with a layer of paste: the beginnings of dendrites which could be formed from superficial grains are drawn away and reincorporated into the paste owing to its motion: the development of dendrites is now impossible.

Number of possible cycles: these are now divided into the following points:

(a) life of the battery and electrolyser
(b) number of cycles supportable by the paste.

The life of the battery and that of the electrolyser is long due to the absence of a structural change and to the separation of the generation and recharging operations (this also avoiding the destruction of the air-electrode) and of the non-integrated form of the reactants and the absence of critical electrocatalysis.

As for the zinc paste, its characteristics and working procedure shows that it can be recycled if not indefinitely, at least a considerable number of times. Furthermore, the zinc is entirely recoverable and re-usable and if it is necessary to replace it, this can be done immediately when the paste has been altered sufficiently so that it exceeds acceptable limits.

The preferred composition of the paste is comprised between the CPVC value and 90% of the CPVC value. These values are expressed in volume because the CPVC value is defined in terms of volume.

The preferred particle size of zinc is comprised between 1 and 30 microns, the mean value being about 10 microns.

The concentration of the lubricant is comprised between 1 and 5% by weight preferably 2%.

The concentration of mercury is comprised between 2 and 4% by weight.

I claim:

1. A method for producing electricity by oxidizing a metal and reducing oxygen, comprising
    electrolytically connecting an oxygen-reducing electrode with an inert anode which is in contact with a pumpable paste consisting essentially of particles of an oxidizable metal and a liquid electrolyte and being free from gelling agents, said paste being physically separated from said oxygen-reducing electrode by an ion-pervious insulating membrane abutting said oxygen-reducing electrode and providing said electrolytic connection between said oxygen-reducing electrode and said inert anode,
    said oxidizable metal being a metal that forms a solid metal oxide and said liquid electrolyte being a liquid which does not dissolve said solid metal oxide,
    said paste of said metal and said electrolyte comprising very fine metal particles in metal-to-metal contact with each other, and electrolyte filling the interstices between the metal particles and having a concentration of metal particles between (i) the amount constituting the critical pigment volume composition (CPVC) and (ii) an amount at least 60% by volume of said CPVC
    contacting said oxygen-reducing electrode with an oxygen-containing gas;
    connecting said electrodes through an external electric circuit, whereby electricity flow through said circuit; and
    moving said paste relative to said inert anode while said electrodes are externally connected, whereby the metal particles in said paste are progressively transformed into metal oxide particles.

2. The method of claim 1 where the metal particles' size is between about 0.1 and 60 microns.

3. The method of claim 1 wherein said paste of metal and electrolyte contacts said ion-pervious insulating membrane.

4. The method of claim 3 wherein said metal is selected from the group consisting of zinc, iron, cadmium and lead.

5. The method of claim 4 wherein said metal is zinc and said electrolyte is alkaline having a concentration between 7 and 13.5 N.

6. The method of claim 5 wherein said electrolyte is selected from the group consisting of sodium hydroxide and potassium hyroxide.

7. The method of claim 6 wherein said concentration of metal particles is between the CPVC value and 90% by volume of the CPVC value.

8. The method of claim 7 wherein said paste contains a powdered polytetrafluoroethylene or powdered graphite as a solid lubricant.

9. The method of claim 7 wherein said oxygen-containing gas is atmospheric air.

10. The method of claim 3 wherein said paste consists essentially of 27% by volume of zinc powder, 3% of polytetrafluorethylene, and 70% of 10 N potassium hydroxide.

11. The method of claim 4 wherein said electrolyte is sodium hydroxide or potassium hydroxide having a pH between 0.1 N and 13.5 N, and where said metal is zinc.

12. The method of claim 6 wherein said oxygen-containing gas is atmospheric air.

13. A paste useful in the method of claim 1 consisting essentially of zinc particles in surface to surface contact and alkaline electrolyte in the interstices between particles, said zinc particles being in an amount between the critical pigment volume composition and 60% by volume of said composition, and said particles having a size of between about 0.1 and 60 microns.

14. The paste of claim 13 consisting essentially of 27% by volume of zinc, 3% of polytetrafluorethylene or graphite, and 70% of 10 N potassium hydroxide.

15. The paste of claim 13 containing zinc particles in an amount between the critical pigment volume composition and 90% by volume of said composition.

16. A paste useful in the method of claim 1 consisting essentially of zinc oxide particles in surface to surface contact and alkaline electrolyte in the interstices between particles, said zinc oxide particles being in an amount between the critical pigment volume composition and 60% by volume of said composition, and said particles having a size of between about 0.1 and 60 microns.

17. The paste of claim 16 consisting essentially of 37% by volume of zinc oxide, 3% of polytetrafluorethylene or graphite, and 60% of 10 N potassium hydroxide.

18. The paste of claim 16 containing zinc particles in an amount between the critical pigment volume composition and 90% by volume of said composition.

19. The method of claim 1 wherein said concentration of metal particles is between the critical pigment volume composition and 90% by volume of said composition.

20. Apparatus for carrying out the method of claim 1 comprising
    a first paste reservoir,
    a second paste reservoir,
    a conduit connecting said first and second paste reservoirs, said conduit containing an electrochemical battery,
        said electrochemical battery comprising at least one, inert oxygen-reducing electrode, an ion-pervious insulating diaphragm in electrolytic contact with and abutting said oxygen-reducing electrode, an inernal inert anode, said anode being spaced apart from said diaphragm by an internal space,
        said electrochemical battery being at least a portion of said conduit, and said space separating said internal inert anode and said diaphragm, said space communicating with both of said reservoirs,
    and means for moving said paste from said first reservoir to said second reservoir through said conduit and electrochemical battery.

21. The apparatus of claim 20 wherein said diaphragm is a simple diaphragm.

22. The apparatus of claim 20 wherein said diaphragm is a composite diaphragm.

23. The apparatus of claim 20 wherein said anode comprises at least a portion of said moving means.

24. The apparatus of claim 23 wherein said anode and moving means comprise a screw-type conveyor in said conduit.

* * * * *